(12) United States Patent
Su et al.

(10) Patent No.: US 11,442,028 B1
(45) Date of Patent: Sep. 13, 2022

(54) METHOD FOR JOINT MEASURING ARGON-ARGON AGE AND COSMIC RAY EXPOSURE AGE OF EXTRATERRESTRIAL SAMPLES

(71) Applicant: INSTITUTE OF GEOLOGY AND GEOPHYSICS, Beijing (CN)

(72) Inventors: Fei Su, Beijing (CN); Huaiyu He, Beijing (CN); Ziheng Liu, Beijing (CN); Jiannan Li, Beijing (CN); Ruihong Yang, Beijing (CN)

(73) Assignee: INSTITUTE OF GEOLOGY AND GEOPHYSICS, Beijing (CN)

( * ) Notice: Subject to any disclaimer, the term of this patent is extended or adjusted under 35 U.S.C. 154(b) by 0 days.

(21) Appl. No.: 17/547,607

(22) Filed: Dec. 10, 2021

(30) Foreign Application Priority Data

Aug. 2, 2021 (CN) .......................... 202110878204.5

(51) Int. Cl.
*G01N 23/00* (2006.01)
*G01T 1/167* (2006.01)
*H01J 49/26* (2006.01)
*G21G 1/02* (2006.01)

(52) U.S. Cl.
CPC ........... *G01N 23/005* (2013.01); *G01T 1/167* (2013.01); *G21G 1/02* (2013.01); *H01J 49/26* (2013.01)

(58) Field of Classification Search
CPC ........ G01N 23/005; G01T 1/167; G21G 1/02; H01J 49/26
See application file for complete search history.

(56) References Cited

U.S. PATENT DOCUMENTS

| | | | |
|---|---|---|---|
| 11,231,349 B1* | 1/2022 | Du | G01N 1/32 |
| 11,360,037 B1* | 6/2022 | Wu | G06V 10/764 |
| 2005/0205798 A1* | 9/2005 | Downing | G01T 3/008 250/390.11 |
| 2016/0291197 A1* | 10/2016 | Sossong | G01T 3/008 |
| 2017/0329038 A1* | 11/2017 | Kang | G01V 5/0091 |
| 2020/0271632 A1* | 8/2020 | Muller | G01N 33/182 |
| 2020/0378911 A1* | 12/2020 | Liu | G01R 33/305 |
| 2021/0057204 A1* | 2/2021 | Liu | H01J 49/24 |
| 2021/0156769 A1* | 5/2021 | Su | G01N 1/286 |

\* cited by examiner

*Primary Examiner* — David A Vanore
(74) *Attorney, Agent, or Firm* — WPAT, PC

(57) ABSTRACT

A method for joint measuring argon-argon age and cosmic ray exposure age of an extraterrestrial sample is provided. The method for joint measuring determining argon age and cosmic ray exposure age may include: step A, sample packaging; step B, placing the packaged samples into a neutron reactor for irradiation; and step C, determining Ar isotopes of the packaged samples after being performed with a neutron irradiation and thereby calculating argon-argon age and cosmic ray exposure age. The method can overcome the defects of the prior art, and achieve high-precision simultaneous determination of the argon-argon age and the cosmic ray exposure age of samples.

7 Claims, 1 Drawing Sheet

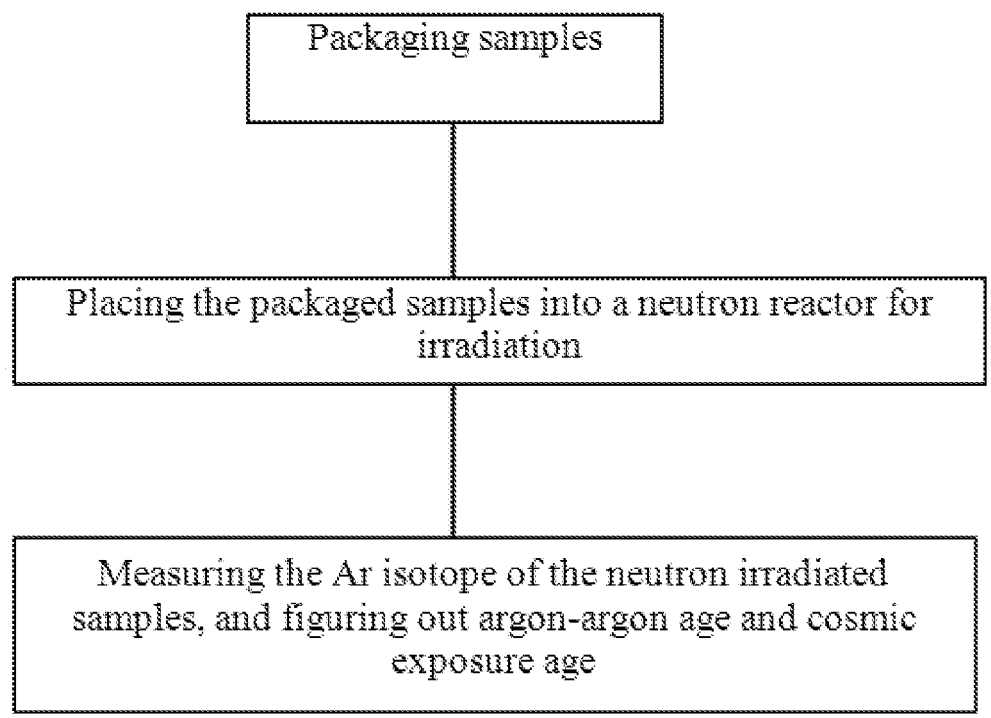

METHOD FOR JOINT MEASURING ARGON-ARGON AGE AND COSMIC RAY EXPOSURE AGE OF EXTRATERRESTRIAL SAMPLES

TECHNICAL FIELD

The invention relates to the technical field of extraterrestrial sample detection, particularly to a method for joint measuring argon-argon age and cosmic ray exposure age of extraterrestrial samples.

BACKGROUND

When the properties of extraterrestrial samples are studied, the determination of argon age and cosmic ray exposure age are common detection items. In the prior art, the above detection items are usually separately detected, involving quite many operation steps and unsatisfactory detection accuracy. Moreover, it is necessary to prepare two samples for separate detections. Because of the heterogeneity of the samples, the argon-argon age and cosmic ray exposure age determined by the two samples are quite unlikely to explain a geological process at the same time. Because extraterrestrial samples are precious and rare, it is particularly important to get as much information as possible with as few samples as possible.

SUMMARY

The technical problem to be solved by the invention is to provide the method for joint measuring argon-argon age and cosmic ray exposure age of an extraterrestrial sample, which can overcome the defects of the prior art and realize high-precision joint measurement of argon-argon age and cosmic ray exposure age of samples.

To solve the above technical problem, the technical solution adopted by the invention is as follows.

Specifically, the invention relates to a method for joint measuring argon-argon age and cosmic ray exposure age of an extraterrestrial sample, including the following steps:

step A, sample packaging;

step B, placing the packaged samples in a glass tube into a neutron reactor for irradiation; and step C, determining Ar isotopes of the packaged samples after being performed with a neutron irradiation and thereby calculating argon-argon age and cosmic ray exposure age.

In an embodiment, in the step A, a sample to be determined is packaged into cylindrical shapes with a diameter of 5 mm (millimeter) with aluminum foils, the packaged samples and a chronology standard sample are placed at intervals in a vertical direction, and then the packaged samples and the chronology standard sample are put into the glass tube.

In an embodiment, in the step B, a potassium salt and a calcium salt are individually packaged into cylindrical shapes with a diameter of 5 mm, and the neutron irradiation is performed on the potassium salt and the calcium salt together with the glass tube containing the packaged samples, and 1-2 cylindrical shapes of potassium salt and 1-2 cylindrical shapes of calcium salt are used during each time of the neutron irradiation.

In an embodiment, in the step C, gas components of the packaged samples after being performed with the neutron irradiation are released by means of laser heating and melting or high temperature furnace heating and melting, and after active gas is removed from the gas components to obtain remaining gas, the remaining gas is subsequently delivered to a rare gas mass spectrometer to determine the Ar isotopes;

where formulas for calculating the argon-argon age are:

$$t = \frac{1}{\lambda}\ln\left(1 + J\frac{^{40}Ar^*}{^{39}Ar_K}\right),$$

$$J = \frac{^{39}K}{^{40}K}\frac{\lambda}{\lambda_e + \lambda'_e}\Delta\int\phi(E)\sigma(E)dE;$$

where a formula for calculating the cosmic ray exposure age is:

$$\text{Exposure age} = \left(\frac{^{38}Ar_{cos}}{^{37}Ar_{ca}}\right)\left(\frac{\gamma}{\frac{P_{38}}{|C_a|}}\right);$$

where $t$ is the argon-argon age, $\lambda$ is a decay constant, $\lambda_e$ and $\lambda'_e$ are decay constants of two branches decaying from $^{40}K$ to $^{40}Ar$ respectively, $^{40}Ar^*$ is a radiogenic factor, $^{39}Ar_K$ is $^{39}Ar$ produced by the neutron irradiation at $^{39}K$, $^{39}K$ and $^{40}K$ are potassium isotopes respectively, $\Delta$ is an irradiation time, $\phi(E)$ is a neutron flux with energy E, $\sigma(E)$ is a neutron reaction cross section with energy E, Exposure age is the cosmic ray exposure age, $^{38}Ar_{cos}$ is cosmogenic radionuclide $^{38}Ar$, $^{37}Ar_{Ca}$ is $^{37}Ar$ produced by Ca during the neutron irradiation in the neutron reactor, $$\frac{P_{38}}{|C_a|}$$

is a yield of $^{38}Ar_{cos}$ relative to Ca concentration, and $\gamma$ is an irradiation parameter related to $^{37}Ar_{Ca}$ and Ca content.

In an embodiment, before the determining Ar isotopes of the packaged samples, a system background is determined according to a same determining flow as that of the packaged samples and the system background is used for background correction, and formulas are used as follows:

$$^{40}Ar = {^{40}Ar_m} - {^{40}Ar_b}$$

$$^{39}Ar = {^{39}Ar_m} - {^{39}Ar_b}$$

$$^{38}Ar = {^{38}Ar_m} - {^{38}Ar_b}$$

$$^{37}Ar = {^{37}Ar_m} - {^{37}Ar_b}$$

$$^{36}Ar = {^{36}Ar_m} - {^{36}Ar_b}$$

where those with subscript m represent determined values of actual samples, and those with subscript b represent background values.

In an embodiment, a mass discrimination correction factor MDF is corrected based on multiple determinations of standard air according to the following formula that:

$$MDF = \sqrt{\sqrt{\left(\frac{^{40}Ar}{^{36}Ar}\right)_{actual\ determination} \Big/ \left(\frac{^{40}Ar}{^{36}Ar}\right)_{theoretical}}},$$

where $(^{40}Ar/^{36}Ar)_{theoretical}$ is a theoretical value of a ratio of $^{40}Ar/^{36}Ar$ in air, and $(^{40}Ar/^{36}Ar)_{actual\ determination}$ is a ratio of $^{40}Ar/^{36}Ar$ obtained after actual determination of air.

In an embodiment, based on $^{40}Ar$, mass discrimination corrections of others of the Ar isotopes are performed respectively according to difference of mass numbers according to the following formulas that:

$$^{39}Ar_{corr} = {}^{39}Ar\left\{\left(\frac{1}{MDF}\right) - 1 + 1\right\}$$

$$^{38}Ar_{corr} = {}^{38}Ar\left\{\left(\frac{2}{MDF}\right) - 2 + 1\right\}$$

$$^{37}Ar_{corr} = {}^{37}Ar\left\{\left(\frac{3}{MDF}\right) - 3 + 1\right\}$$

$$^{36}Ar_{corr} = {}^{36}Ar\left\{\left(\frac{4}{MDF}\right) - 4 + 1\right\}$$

In an embodiment, decay corrections to $^{37}Ar$ and $^{39}Ar$ are performed according to the following formula that:

$$^{m}Ar_{corr} = {}^{m}Ar\left\{\frac{\sum_{i=1}^{n}P_id_i}{\sum_{i=1}^{n}P_i\left(\frac{1-\exp(-\lambda_m d_i)}{\lambda_m\exp(\lambda_m t_i)}\right)}\right\},$$

where $^{m}Ar_{corr}$ is a value of the Ar isotope with mass number m after the mass discrimination correction, m is the mass number, i.e., m=37 or 39, $\lambda_m$ is a decay constant of the Ar isotope with the mass number m, $P_i$ is an energy level of the neutron reactor, n is number of irradiation cycles, d is a duration of each the irradiation cycle and has a unit of hour, and t is a time interval between irradiation and determination and has a unit of hour.

In an embodiment, interference factors in a process of the neutron irradiation are corrected, which specifically includes: the Ar isotopes of K salt and Ca salt are determined after being performed with the neutron irradiation and calculated to obtain the correction parameters of K and Ca, including $(^{36}Ar/^{37}Ar)_{Ca}$, $(^{38}Ar/^{39}Ar)_K$, $(^{39}Ar/^{37}Ar)_{Ca}$, $(^{40}Ar/^{39}Ar)_K$, and all of $^{37}Ar$ are produced by Ca during the process of the neutron irradiation, $^{37}Ar_{corr} = {}^{37}Ar_{Ca}$; and formulas are used as follows:

$$\left(\frac{^{39}Ar}{^{37}Ar}\right)_{Ca} = \frac{^{39}Ar_{corr} - {}^{40}Ar/298}{^{37}Ar_{corr}}$$

$$\left(\frac{^{39}Ar}{^{37}Ar}\right)_{Ca} = \frac{^{39}Ar_{corr}}{^{37}Ar_{corr}}$$

$$\left(\frac{^{40}Ar}{^{39}Ar}\right)_K = \frac{^{40}Ar - {}^{36}Ar_{corr} \times 298}{^{39}Ar_{corr}}$$

$$\left(\frac{^{38}Ar}{^{39}Ar}\right)_K = \frac{^{38}Ar_{corr}}{^{39}Ar_{corr}},$$

$$^{36}Ar_{corr} = {}^{36}Ar - {}^{36}Ar_{ca} = {}^{36}Ar - \left(^{36}Ar/^{37}Ar\right)_{Ca} * {}^{37}Ar_{Ca}$$

$$^{39}Ar_K = {}^{39}Ar_{corr} - {}^{39}Ar_{ca} = {}^{39}Ar_{corr} - \left(^{39}Ar/^{37}Ar\right)_{Ca} * {}^{37}Ar_{Ca}$$

$$^{38}Ar_{corr} = {}^{38}Ar - {}^{38}Ar_K = {}^{38}Ar - \left(^{38}Ar/^{39}Ar\right)_K * {}^{39}Ar_K$$

$$^{40}Ar_{corr} = {}^{40}Ar - {}^{40}Ar_K = {}^{40}Ar - \left(^{40}Ar/^{39}Ar\right)_K * {}^{39}Ar_K.$$

In an embodiment, cosmogenic radionuclide $^{38}Ar$ is corrected according to the following formulas that:

$$^{38}Ar_{cos} = {}^{38}Ar_{corr} \times \left[1 - \left(\frac{\frac{^{36}Ar_{corr}}{^{38}Ar_{corr}}}{\left(\frac{^{36}Ar}{^{38}Ar}\right)_{trapped}}\right)\right] / \left[1 - \frac{\left(\frac{^{36}Ar}{^{38}Ar}\right)_{cos}}{\left(\frac{^{36}Ar}{^{38}Ar}\right)_{trapped}}\right],$$

$$^{38}Ar_{trapped} = {}^{38}Ar_{corr} - {}^{38}Ar_{cos}$$

$$^{36}Ar_{cos} = {}^{38}Ar_{cos} \times \left(^{36}Ar/^{38}Ar\right)_{cos}$$

$$^{36}Ar_{trapped} = {}^{38}Ar_{trapped} \times \left(^{36}Ar/^{38}Ar\right)_{trapped}$$

$$^{40}Ar_{trapped} = {}^{36}Ar_{trapped} \times \left(^{40}Ar/^{36}Ar\right)_{trapped}$$

$$^{40}Ar^* = {}^{40}Ar_{corr} - {}^{40}Ar_{trapped},$$

where $^{38}Ar_{trapped}$ is an amount of $^{38}Ar$ in trapped components, $(^{36}Ar/^{38}Ar)_{cos}$ is a ratio of cosmogenic radionuclides $^{36}Ar/^{38}Ar$, $^{40}Ar/^{36}Ar_{trapped}$ is a ratio of $^{40}Ar/^{36}Ar$ in the trapped components, $^{36}Ar_{trapped}$ is an amount of $^{36}Ar$ in the trapped components, $^{40}Ar_{trapped}$ is an amount of $^{40}Ar$ in the trapped components, and $(^{36}Ar/^{38}Ar)_{trapped}$ is a ratio of $^{36}Ar/^{38}Ar$ in the trapped components.

The technical solution has the following beneficial effects: aiming at an extraterrestrial sample after neutron activation, the invention realizes the synchronous determination of the argon-argon age and the cosmic ray exposure age of the same sample by improving the sample processing method and calculation process, and correcting and distinguishing the Ar isotopes from different sources.

BRIEF DESCRIPTION OF DRAWING

FIG. 1 is a flow chart of an embodiment of the invention.

DETAILED DESCRIPTION OF EMBODIMENTS

Specifically, a method for joint measuring argon-argon age and cosmic ray exposure age of an extraterrestrial sample may include the following steps:

step A, sample packaging;

step B, placing the packaged samples in a glass tube into a neutron reactor for irradiation; and step C, determining Ar isotopes of the packaged samples after being performed with a neutron irradiation and thereby calculating argon-argon age and cosmic ray exposure age.

In the step A, a sample to be determined is packaged into cylindrical shapes with a diameter of 5 millimeters (mm) with aluminum foils, the packaged samples and a chronology standard sample are placed at intervals in a vertical direction, and then the packaged samples and the chronology standard sample are put into the glass tube.

In the step B, a potassium salt (e.g., $K_2SO_4$) and a calcium salt (e.g., $Ca_2F$) are individually packaged into cylindrical shapes with a diameter of 5 mm, and the neutron irradiation is performed on the potassium salt and the calcium salt together with the glass tube containing the packaged samples, and 1-2 cylindrical shapes of potassium salt and 1-2 cylindrical shapes of calcium salt are used during each of the neutron irradiation.

In the step C, gas components of the packaged samples after being performed with the neutron irradiation are released by means of laser heating and melting or high temperature furnace heating and melting, and after active gas is removed from the gas components to obtain remaining gas, the remaining gas is subsequently delivered to a rare gas mass spectrometer to determine the Ar isotopes;

where formulas for calculating the argon-argon age are:

$$t = \frac{1}{\lambda}\ln\left(1 + J\frac{{}^{40}Ar^*}{{}^{39}Ar_K}\right),$$

$$J = \frac{{}^{39}K}{{}^{40}K}\frac{\lambda}{\lambda_e + \lambda'_e}\Delta\int\emptyset(E)\sigma(E)dE;$$

where a formula for calculating the cosmic ray exposure age is:

$$\text{Exposure age} = \left(\frac{{}^{38}Ar_{cos}}{{}^{37}Ar_{ca}}\right)\left(\frac{\gamma}{\frac{P_{38}}{|C_a|}}\right);$$

where t is the argon-argon age, $\lambda$ is a decay constant, $\lambda_e$ and $\lambda'_e$ are decay constants of two branches decaying from $^{40}K$ to $^{40}Ar$ respectively, $^{40}Ar^*$ is a radiogenic factor, $^{39}Ar_K$ is $^{39}Ar$ produced by neutron irradiation at $^{39}K$, $^{39}K$ and $^{40}K$ are potassium isotopes respectively, $\Delta$ is an irradiation time, $\emptyset(E)$ is a neutron flux with energy E, $\sigma(E)$ is a neutron reaction cross section with energy E, Exposure age is the cosmic ray exposure age, $^{38}Ar_{cos}$ is cosmogenic radionuclide $^{38}Ar$, $^{37}Ar_{Ca}$ is $^{37}Ar$ produced by Ca during the neutron irradiation in the neutron reactor, $$\frac{P_{38}}{|C_a|}$$

is a yield of $^{38}Ar_{cos}$ relative to Ca concentration, and $\gamma$ is an irradiation parameter related to $^{37}Ar_{Ca}$ and Ca content.

In order to further improve the determination accuracy, parameters in the determination process are corrected as follows.

In an illustrated embodiment, before the determining Ar isotopes of the packaged samples, a system background is determined according to a same determining flow as that of the packaged samples which is used for background correction, and formulas are used as follows:

$$^{40}Ar = {}^{40}Ar_m - {}^{40}Ar_b$$

$$^{39}Ar = {}^{39}Ar_m - {}^{39}Ar_b$$

$$^{38}Ar = {}^{38}Ar_m - {}^{38}Ar_b$$

$$^{37}Ar = {}^{37}Ar_m - {}^{37}Ar_b$$

$$^{36}Ar = {}^{36}Ar_m - {}^{36}Ar_b$$

where those with subscript m represent determined values of actual samples, and those with subscript b represent background values.

In an illustrated embodiment, the mass discrimination correction factor MDF is corrected based on multiple determinations of standard air according to the following formula that:

$$MDF = \sqrt{\sqrt{\left(\frac{{}^{40}Ar}{{}^{36}Ar}\right)_{\text{actual determination}}\bigg/\left(\frac{{}^{40}Ar}{{}^{36}Ar}\right)_{\text{theoretical}}}},$$

where $({}^{40}Ar/{}^{36}Ar)_{theoretical}$ is the theoretical value of the ratio of $^{40}Ar/{}^{36}Ar$ in air, and $({}^{40}Ar/{}^{36}Ar)_{actual\ determination}$ is the ratio of $^{40}Ar/{}^{36}Ar$ obtained after actual determination of air.

In an illustrated embodiment, based on $^{40}Ar$, mass discrimination corrections of others of the Ar isotopes are performed respectively according to difference of mass numbers according to the following formulas that:

$$^{39}Ar_{corr} = {}^{39}Ar\left\{\left(\frac{1}{MDF}\right) - 1 + 1\right\}$$

$$^{38}Ar_{corr} = {}^{38}Ar\left\{\left(\frac{2}{MDF}\right) - 2 + 1\right\}$$

$$^{37}Ar_{corr} = {}^{37}Ar\left\{\left(\frac{3}{MDF}\right) - 3 + 1\right\}$$

$$^{36}Ar_{corr} = {}^{36}Ar\left\{\left(\frac{4}{MDF}\right) - 4 + 1\right\}$$

In an illustrated embodiment, decay corrections to $^{37}Ar$ and $^{39}Ar$ are performed according to the following formula that:

$$^mAr_{corr} = {}^mAr\left\{\frac{\sum_{i=1}^{n} P_i d_i}{\sum_{i=1}^{n} P_i\left(\frac{1-\exp(-\lambda_m d_i)}{\lambda_m \exp(\lambda_m t_i)}\right)}\right\},$$

where $^mAr_{corr}$ is a value of the Ar isotope with mass number m after the mass discrimination correction, m is the mass number, i.e., m=37 or 39, $\lambda_m$ is a decay constant of the Ar isotope with the mass number m, $P_i$ is an energy level of the neutron reactor, n is number of irradiation cycles, d is a duration of each the irradiation cycle and has a unit of hour, and t is a time interval between irradiation and determination and has a unit of hour.

In an illustrated embodiment, interference factors in a process of the neutron irradiation are corrected, the Ar isotopes of K salt and Ca salt are determined after being performed with the neutron irradiation and calculated to obtain correction parameters of K and Ca, including $({}^{36}Ar/{}^{37}Ar)_{Ca}$, $({}^{38}Ar/{}^{39}Ar)_K$, $({}^{39}Ar/{}^{37}Ar)_{Ca}$, $({}^{40}Ar/{}^{39}Ar)_K$, and all of $^{37}Ar$ are produced by Ca during the process of the neutron irradiation, $^{37}Ar_{corr} = {}^{37}Ar_{ca}$; and formulas are used as follows:

$$\left(\frac{{}^{36}Ar}{{}^{37}Ar}\right)_{Ca} = \frac{{}^{36}Ar_{corr} - {}^{40}Ar/298}{{}^{37}Ar_{corr}}$$

$$\left(\frac{{}^{39}Ar}{{}^{37}Ar}\right)_{Ca} = \frac{{}^{39}Ar_{corr}}{{}^{37}Ar_{corr}}$$

$$\left(\frac{{}^{40}Ar}{{}^{39}Ar}\right)_K = \frac{{}^{40}Ar - {}^{36}Ar_{corr} \times 298}{{}^{39}Ar_{corr}}$$

$$\left(\frac{{}^{38}Ar}{{}^{39}Ar}\right)_K = \frac{{}^{38}Ar_{corr}}{{}^{39}Ar_{corr}},$$

$$^{36}Ar_{corr} = {}^{36}Ar - {}^{36}Ar_{Ca} = {}^{36}Ar - ({}^{36}Ar/{}^{37}Ar)_{Ca} * {}^{37}Ar_{Ca}$$

$$^{39}Ar_K = {}^{39}Ar_{corr} - {}^{39}Ar_{ca} = {}^{39}Ar_{corr} - ({}^{39}Ar/{}^{37}Ar)_{Ca} * {}^{37}Ar_{Ca}$$

$$^{38}Ar_{corr} = {}^{38}Ar - {}^{38}Ar_K = {}^{38}Ar - ({}^{38}Ar/{}^{39}Ar)_K * {}^{39}Ar_K$$

$$^{40}Ar_{corr} = {}^{40}Ar - {}^{40}Ar_K = {}^{40}Ar - ({}^{40}Ar/{}^{39}Ar)_K * {}^{39}Ar_K.$$

In an illustrated embodiment, cosmogenic radionuclide $^{38}$Ar is corrected according to the following formulas that:

$$^{38}Ar\cos = {}^{38}Ar\,corr \times \left[1 - \left(\frac{\frac{^{36}Ar\,corr}{^{38}Ar\,corr}}{\left(\frac{^{36}Ar}{^{38}Ar}\right)_{trapped}}\right)\right] \Bigg/ \left[1 - \frac{\left(\frac{^{36}Ar}{^{38}Ar}\right)_{cos}}{\left(\frac{^{36}Ar}{^{38}Ar}\right)_{trapped}}\right],$$

$$^{38}Ar_{trapped} = {}^{38}Ar_{corr} - {}^{38}Ar_{cos}$$

$$^{36}Ar_{cos} = {}^{38}Ar_{cos} \times \left({}^{36}Ar/{}^{38}Ar\right)_{cos}$$

$$^{36}Ar_{trapped} = {}^{38}Ar_{trapped} \times \left({}^{36}Ar/{}^{38}Ar\right)_{trapped}$$

$$^{40}Ar_{trapped} = {}^{36}Ar_{trapped} \times \left({}^{40}Ar/{}^{36}Ar\right)_{trapped}$$

$$^{40}Ar^{*} = {}^{40}Ar_{corr} - {}^{40}Ar_{trapped},$$

where $^{38}Ar_{trapped}$ is an amount of $^{38}Ar$ in trapped components, $(^{36}Ar/^{38}Ar)_{cos}$ is a ratio of cosmogenic radionuclides $^{36}Ar/^{38}Ar$, $^{40}Ar/^{36}Ar_{trapped}$ is a ratio of $^{40}Ar/^{36}Ar$ in the trapped components, $^{36}Ar_{trapped}$ is an amount of $^{36}Ar$ in the trapped components, $^{40}Ar_{trapped}$ is an amount of $^{40}Ar$ in the trapped components, and $(^{36}Ar/^{38}Ar)_{trapped}$ is a ratio of $^{36}Ar/^{38}Ar$ in the trapped components.

In the description of the invention, it should be understood that the terms "longitudinal", "transverse", "upper", "lower", "front", "rear", "left", "right", "vertical", "horizontal", "top", "bottom", "inner" and "outer" etc. are based on the orientation or positional relationship shown in the drawings, and are only for the convenience of describing the invention, rather than indicating or implying that the device or element referred to must have a specific orientation, be configured and operated in a specific orientation, and therefore cannot be understood as a limitation to the invention.

The above shows and describes the basic principles and main features of the invention and the advantages of the invention. It should be understood by those skilled in the art that the invention is not limited by the above-mentioned embodiments, and the above-mentioned embodiments and descriptions only illustrate the principles of the invention. Without departing from the spirit and scope of the invention, changes and improvements of the invention may be made, all of which shall fall within the protection scope of the invention. The protection scope of the invention shall be defined by the claims and their equivalents.

What is claimed is:

1. A method for joint measuring argon-argon (Ar—Ar) age and cosmic ray exposure age of an extraterrestrial sample, comprising:
   step A, sample packaging: packaging a sample to be determined into cylindrical shapes with a diameter of 5 millimeters (mm) with aluminum foils to obtain packaged samples, placing the packaged samples and a chronology standard sample at intervals in a vertical direction, and then putting the packaged samples and the chronology standard sample into a glass tube;
   step B, placing the packaged samples in the glass tube into a neutron reactor for irradiation: packaging a potassium salt and a calcium salt individually into cylindrical shapes with a diameter of 5 mm, and then performing a neutron irradiation on the potassium salt and the calcium salt together with the glass tube containing the packaged samples, wherein 1-2 cylindrical shapes of potassium salt and 1-2 cylindrical shapes of calcium salt are used during each time of the neutron irradiation; and step C, determining Ar isotopes of the packaged samples after being performed with the neutron irradiation and thereby calculating argon-argon age and cosmic ray exposure age: releasing gas components of the packaged samples after being performed with the neutron irradiation by means of laser heating and melting or high temperature furnace heating and melting, removing active gas from the gas components to obtain remaining gas, and subsequently delivering the remaining gas to a rare gas mass spectrometer to determine the Ar isotopes;
   wherein formulas for calculating the argon-argon age are:

$$t = \frac{1}{\lambda}\ln\left(1 + J\frac{{}^{40}Ar^{*}}{{}^{39}Ar_{K}}\right),$$

$$J = \frac{{}^{39}K}{{}^{40}K}\frac{\lambda}{\lambda_{e} + \lambda'_{e}}\Delta\int\phi(E)\sigma(E)dE;$$

wherein a formula for calculating the cosmic ray exposure age is:

$$\text{Exposure age} = \left(\frac{{}^{38}Ar_{cos}}{{}^{37}Ar_{ca}}\right)\left(\frac{\gamma}{\frac{P_{38}}{|C_{a}|}}\right);$$

where t is the argon-argon age, $\lambda$ is a decay constant, $\lambda_{e}$ and $\lambda'_{e}$ are decay constants of two branches decaying from $^{40}K$ to $^{40}Ar$ respectively, $^{40}Ar^{*}$ is a radiogenic factor, $^{39}Ar_{K}$ is $^{39}Ar$ produced by the neutron irradiation at $^{39}K$, $^{39}K$ and $^{40}K$ are potassium isotopes respectively, A is an irradiation time, $\phi(E)$ is a neutron flux with energy E, $\sigma(E)$ is a neutron reaction cross section with energy E, Exposure age is the cosmic ray exposure age, $^{38}Ar_{cos}$ is cosmogenic radionuclide $^{38}Ar$, $^{37}Ar_{Ca}$ is $^{37}Ar$ produced by Ca during the neutron irradiation in the neutron reactor, $$\frac{P_{38}}{|C_{a}|}$$

is a yield of $^{38}Ar_{cos}$ relative to Ca concentration, and $\gamma$ is an irradiation parameter related to $^{37}Ar_{Ca}$ and Ca content.

2. The method according to claim 1, further comprising:
before the determining Ar isotopes of the packaged samples, determining a system background according to a same determining flow as that of the packaged samples and using the system background for background correction, wherein formulas are used as follows:

$$^{40}Ar = {}^{40}Ar_{m} - {}^{40}Ar_{b}$$

$$^{39}Ar = {}^{39}Ar_{m} - {}^{39}Ar_{b}$$

$$^{38}Ar = {}^{38}Ar_{m} - {}^{38}Ar_{b}$$

$$^{37}Ar = {}^{37}Ar_{m} - {}^{37}Ar_{b}$$

$$^{36}Ar = {}^{36}Ar_{m} - {}^{36}Ar_{b}$$

where those with subscript m represent determined values of actual sample, and those with subscript b represent background values.

3. The method according to claim 2, further comprising: correcting a mass discrimination correction factor MDF based on multiple determinations of standard air, wherein:

$$MDF = \sqrt{\sqrt{\left(\tfrac{^{40}Ar}{^{36}Ar}\right)_{\text{actual determination}} / \left(\tfrac{^{40}Ar}{^{36}Ar}\right)_{\text{theoretical}}}}\,,$$

where $(^{40}Ar/^{36}Ar)_{theoretical}$ is a theoretical value of a ratio of $^{40}Ar/^{36}Ar$ in air, and $(^{40}Ar/^{36}Ar)_{actual\ determination}$ is a ratio of $^{40}Ar/^{36}Ar$ obtained after actual determination of air.

4. The method according to claim 3, further comprising: performing mass discrimination corrections of others of the Ar isotopes respectively according to difference of mass numbers based on $^{40}Ar$, according to the following formulas that:

$$^{39}Ar_{corr} = {}^{39}Ar\left\{\left(\tfrac{1}{MDF}\right) - 1 + 1\right\}$$

$$^{38}Ar_{corr} = {}^{38}Ar\left\{\left(\tfrac{2}{MDF}\right) - 2 + 1\right\}$$

$$^{37}Ar_{corr} = {}^{37}Ar\left\{\left(\tfrac{3}{MDF}\right) - 3 + 1\right\}$$

$$^{36}Ar_{corr} = {}^{36}Ar\left\{\left(\tfrac{4}{MDF}\right) - 4 + 1\right\}$$

5. The method according to claim 4, further comprising: performing decay corrections to $^{37}Ar$ and $^{39}Ar$ according to the following formula that:

$$^{m}Ar_{corr} = {}^{m}Ar\left\{\frac{\sum_{i=1}^{n} P_i d_i}{\sum_{i=1}^{n} P_i\left(\frac{1-\exp(-\lambda_m d_i)}{\lambda_m \exp(\lambda_m t_i)}\right)}\right\},$$

where $^{m}Ar_{corr}$ is a value of the Ar isotope with mass number m after the mass discrimination correction, m is the mass number, and m=37 or 39; $\lambda_m$ is a decay constant of the Ar isotope with the mass number m, $P_i$ is an energy level of the neutron reactor, n is number of irradiation cycles, d is a duration of each the irradiation cycle and has a unit of hour, and t is a time interval between irradiation and determination and has a unit of hour.

6. The method according to claim 5, further comprising: correcting interference factors in a process of the neutron irradiation, which specifically comprises: determining the Ar isotopes of K salt and Ca salt after being performed with the neutron irradiation and calculating to obtain correction parameters of K and Ca, including $(^{36}Ar/^{37}Ar)_{Ca}$, $(^{38}Ar/^{39}Ar)_{K}$, $(^{39}Ar/^{37}Ar)_{Ca}$, $(^{40}Ar/^{39}Ar)_{K}$, wherein all of $^{37}Ar$ are produced by Ca during the process of the neutron irradiation, $^{37}Ar_{corr}={}^{37}Ar_{ca}$, and formulas are used as follows:

$$\left(\tfrac{^{36}Ar}{^{37}Ar}\right)_{Ca} = \frac{^{36}Ar_{corr} - {}^{40}Ar/298}{^{37}Ar_{corr}}$$

$$\left(\tfrac{^{39}Ar}{^{37}Ar}\right)_{Ca} = \frac{^{39}Ar_{corr}}{^{37}Ar_{corr}}$$

$$\left(\tfrac{^{40}Ar}{^{39}Ar}\right)_{K} = \frac{^{40}Ar - {}^{36}Ar_{corr} \times 298}{^{39}Ar_{corr}}$$

$$\left(\tfrac{^{38}Ar}{^{39}Ar}\right)_{K} = \frac{^{38}Ar_{corr}}{^{39}Ar_{corr}},$$

$$^{36}Ar_{corr} = {}^{36}Ar - {}^{36}Ar_{Ca} = {}^{36}Ar - \left(^{36}Ar/{}^{37}Ar\right)_{Ca} * {}^{37}Ar_{Ca}$$

$$^{39}Ar_{K} = {}^{39}Ar_{corr} - {}^{39}Ar_{ca} = {}^{39}Ar_{corr} - \left(^{39}Ar/{}^{37}Ar\right)_{Ca} * {}^{37}Ar_{Ca}$$

$$^{38}Ar_{corr} = {}^{38}Ar - {}^{38}Ar_{K} = {}^{38}Ar - \left(^{38}Ar/{}^{39}Ar\right)_{K} * {}^{39}Ar_{K}$$

$$^{40}Ar_{corr} = {}^{40}Ar - {}^{40}Ar_{K} = {}^{40}Ar - \left(^{40}Ar/{}^{39}Ar\right)_{K} * {}^{39}Ar_{K}.$$

7. The method according to claim 6, further comprising: correcting the cosmogenic radionuclide $^{38}Ar$ according to the following formulas that:

$$^{38}Ar\cos = {}^{38}Ar\,corr \times \left[1 - \left(\frac{\frac{^{36}Ar\,corr}{^{38}Ar\,corr}}{\left(\frac{^{36}Ar}{^{38}Ar}\right)_{trapped}}\right)\right] / \left[1 - \frac{\left(\frac{^{36}Ar}{^{38}Ar}\right)_{cos}}{\left(\frac{^{36}Ar}{^{38}Ar}\right)_{trapped}}\right],$$

$$^{38}Ar_{trapped} = {}^{38}Ar_{corr} - {}^{38}Ar_{cos}$$

$$^{36}Ar_{cos} = {}^{38}Ar_{cos} \times \left(^{36}Ar/{}^{38}Ar\right)_{cos}$$

$$^{36}Ar_{trapped} = {}^{38}Ar_{trapped} \times \left(^{36}Ar/{}^{38}Ar\right)_{trapped}$$

$$^{40}Ar_{trapped} = {}^{36}Ar_{trapped} \times \left(^{40}Ar/{}^{36}Ar\right)_{trapped}$$

$$^{40}Ar^* = {}^{40}Ar_{corr} - {}^{40}Ar_{trapped},$$

where $^{38}Ar_{trapped}$ is an amount of $^{38}Ar$ in trapped components, $(^{36}Ar/^{38}Ar)cos$ is a ratio of cosmogenic radionuclides $^{36}Ar/^{38}Ar$, $^{40}Ar/^{36}Ar_{trapped}$ is a ratio of $^{40}Ar/^{36}Ar$ in the trapped components, $^{36}Ar_{trapped}$ is an amount of $^{36}Ar$ in the trapped components, $^{40}Ar_{trapped}$ is an amount of $^{40}Ar$ in the trapped components, and $(^{36}Ar/^{38}Ar)_{trapped}$ is a ratio of $^{36}Ar/^{38}Ar$ in the trapped components.

* * * * *